Aug. 10, 1926.

G. E. FRAVEL 1,595,182

WHEEL AND TIRE

Filed August 22, 1925

Glen E. Fravel, Inventor

By Richard B. Oliver

Attorney

Witnesses
C. E. Churchman

Patented Aug. 10, 1926.

1,595,182

UNITED STATES PATENT OFFICE.

GLEN E. FRAVEL, OF PORTLAND, OREGON.

WHEEL AND TIRE.

Application filed August 22, 1925. Serial No. 51,773.

This invention relates to wheels, and tires carried thereby, and has for its object the production of a simple and efficient metallic wheel which is so constructed as to efficiently support and secure a solid elastic tire to the rim of the wheel.

Another object of this invention is the production of a wheel and tire which can be constructed at the minimum cost, and which is especially adapted for use upon children's wagons, automobiles, scooters, kiddy cars, baby carriages and other small vehicles where solid rubber tires are used.

With these and other objects in view, this invention consists of certain novel construction, combinations, arrangements of parts as will be hereinafter more fully described and claimed.

Figure 1:
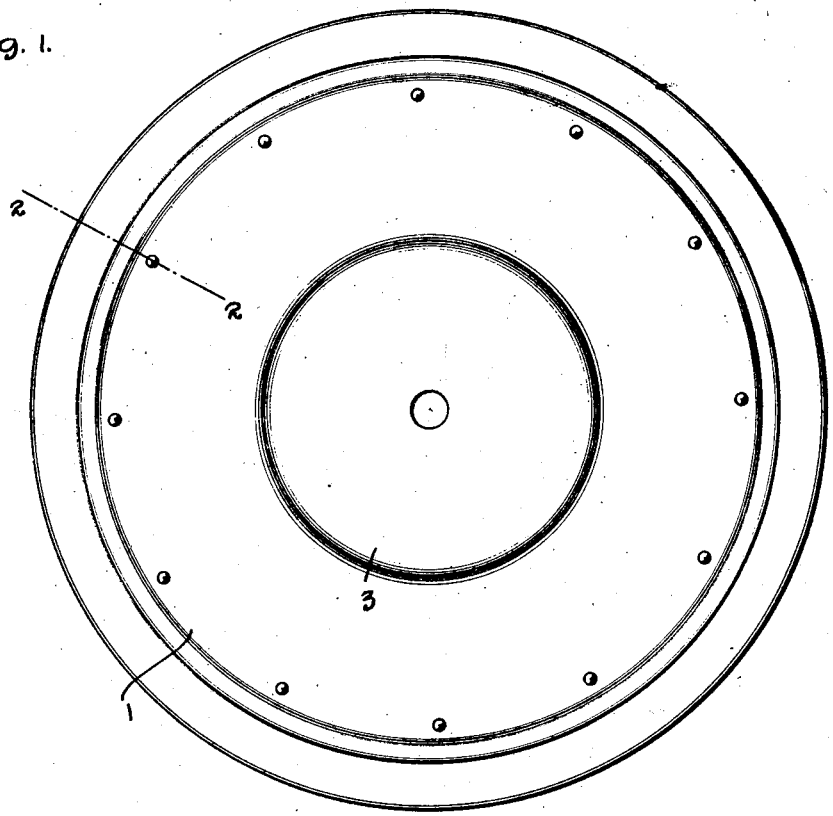
Figure 1 is a side elevation of the wheel.

By referring to the drawings it will be seen that 1 designates the body of the wheel which comprises a pair of similarly constructed discs 2, of any suitable or desired design, these discs 2 having their central portions widened laterally as indicated at 3 in the usual manner. The abutting faces of the discs 2 are arranged in close relation near the rim portion 3' thereof, as illustrated clearly in Figure 2, and the respective disc portions 2 are securely held together by means of the rivet 4, these rivets 4 being arranged in suitable relation adjacent the rim portion 3' near the periphery of the wheel.

Each disc 2, as stated above, is provided with a rim portion 3' which is bent laterally relative to the side of the disc portion 2, and is provided with an in-turned flange 5, this in-turned flange 5 being folded backwardly upon itself so as to have the extremity 6 thereof extending under the top portion of the flange 5, thereby constituting a folded-under, reinforcing tire gripping flange.

A solid tire 7 is secured to the rim portion 3', and this tire may be made of any suitable or desired material, although it is preferable to have the same constructed of rubber, as is usual in such cases. The tire 7 is provided upon each side thereof with circumferentially extending channels 8 near the inner edge of the tire within which channels 8 extend the inwardly extending tire gripping flanges 5 of the disc 2.

Figure 3:
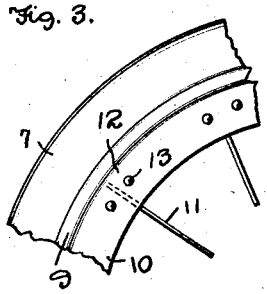
Figure 3 is a side elevation of a modified form of the invention showing the manner of using the device in connection with a spoked wheel.
Figure 2:
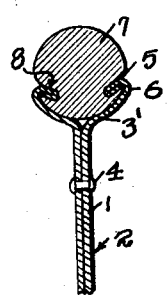
Figure 2 is a section taken on line 2—2 of Figure 1.

It should be understood that in constructing the wheel, the tire 7 is placed between the two discs 2 before the rivets 4 are securely fastened. The tire gripping flanges 5 are forced into the circumferential channels 8 thereby firmly gripping the tire 7 and preventing the same from becoming accidentally removed from the wheel 1. After the tire has been placed firmly upon the rim of the wheel, the rivets 4 are fastened or secured, and by considering Figure 2 it will be seen that by this structure the wheel will be greatly reinforced. In Figure 3 I have shown a modified form of my invention, wherein the rim 9 is formed similarly to that as illustrated in Figure 2, as well as the tire 7. Rim 9, however, is provided with inwardly extending web-portions 10, this rim 9 constituting a pair of similarly constructed plates similar to the plates or discs 2. Spokes 11 have their terminal portions 12 imbedded between the respective discs of the rim 9 and suitable rivets 13 pass through the rim or web-portions 10 of the rim 9, upon either side of the spokes 11, and assist in holding the spokes in proper position.

The structure shown in Figure 3 is especially adapted for use in connection with spoked wheels.

It should be understood that certain detail changes in mechanical construction may be employed without departing from the spirit of the invention, so long as these changes fall within the scope of the appended claim.

What I claim as new is:

A wheel of the class described comprising a pair of disk plates, each plate provided with a laterally extending rim portion, the periphery of each plate being bent inwardly to form a tire gripping flange, the edge of said flange being folded under and rearwardly and terminating immediately adjacent the inner end of said flange, said folded portion bearing against the under surface of the flange for reinforcing the same, said flange and folded portion extending downwardly and inwardly relative to the said rim portion at an acute angle thereto, and said tire adapted to rest upon the laterally extending rim portions and provided with a plurality of circumferentially extending channels for receiving the flanges of said rim.

In testimony whereof I affix my signature.

GLEN E. FRAVEL.